(12) United States Patent
Holert

(10) Patent No.: US 7,861,978 B2
(45) Date of Patent: Jan. 4, 2011

(54) DRIVE AND GUIDE ARRANGEMENT FOR A FLAP WHICH IS ARRANGED ON AN AIRCRAFT MAINPLANE

(75) Inventor: Ben Holert, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 481 days.

(21) Appl. No.: 11/456,076

(22) Filed: Jul. 6, 2006

(65) Prior Publication Data

US 2007/0102589 A1    May 10, 2007

(30) Foreign Application Priority Data

Jul. 6, 2005 (DE) .................. 10 2005 031 840

(51) Int. Cl.
*B64C 3/50* (2006.01)
(52) U.S. Cl. .................................... 244/215
(58) Field of Classification Search .......... 244/211–217
See application file for complete search history.

(56) References Cited

U.S. PATENT DOCUMENTS

| 2,373,365 | A | * | 4/1945 | Westberg | 244/216 |
|---|---|---|---|---|---|
| 3,853,289 | A | * | 12/1974 | Nevermann et al. | 244/215 |
| 4,171,787 | A | * | 10/1979 | Zapel | 244/219 |
| 4,172,575 | A | * | 10/1979 | Cole | 244/216 |
| 4,248,395 | A | * | 2/1981 | Cole | 244/216 |
| 4,444,368 | A | * | 4/1984 | Andrews | 244/216 |
| 4,447,027 | A | | 5/1984 | Wang | |
| 4,448,375 | A | | 5/1984 | Herndon | |
| 4,605,187 | A | * | 8/1986 | Stephenson | 244/216 |
| 4,702,442 | A | * | 10/1987 | Weiland et al. | 244/216 |
| RE32,907 | E | * | 4/1989 | Rudolph | 244/215 |
| 5,158,252 | A | * | 10/1992 | Sakurai | 244/214 |
| 5,230,487 | A | * | 7/1993 | Gartelmann et al. | 244/216 |
| 5,564,655 | A | * | 10/1996 | Garland et al. | 244/216 |
| 6,375,126 | B1 | * | 4/2002 | Sakurai et al. | 244/214 |
| 6,382,566 | B1 | * | 5/2002 | Ferrel et al. | 244/215 |
| 6,601,801 | B1 | * | 8/2003 | Prow et al. | 244/216 |
| 7,243,881 | B2 | * | 7/2007 | Sakurai et al. | 244/212 |
| 7,270,305 | B2 | * | 9/2007 | Rampton et al. | 244/214 |

FOREIGN PATENT DOCUMENTS

DE    10 2005 031 840 A1    3/2007

* cited by examiner

*Primary Examiner*—Tien Dinh
*Assistant Examiner*—Joseph W Sanderson
(74) *Attorney, Agent, or Firm*—Intellectual Property Law Group LLP; Juneko Jackson; Otto O. Lee

(57) ABSTRACT

A drive and guidance apparatus for a trailing-edge/landing flap,-arranged on an aircraft mainplane, the apparatus comprising a six-element guide chain having seven rotating joints and one or more shafts; a first coupling element mounted via a crank connected to the mainplane wherein the crank can rotate, the coupling is connected to the flap and to a second coupling element wherein the first coupling can rotate, the second coupling mounted on the mainplane wherein the second coupling can rotate. The second coupling element is connected to the flap via an oscillating support. The crank is arranged wherein the rotation direction of the crank for extension of the flap corresponds to the rotation direction of the crank for the trailing-edge flap of the starboard wing of the mainplane, with the rotation direction of the crank for the trailing-edge flap of the starboard wing being counterclockwise when viewed from the aircraft fuselage.

8 Claims, 2 Drawing Sheets

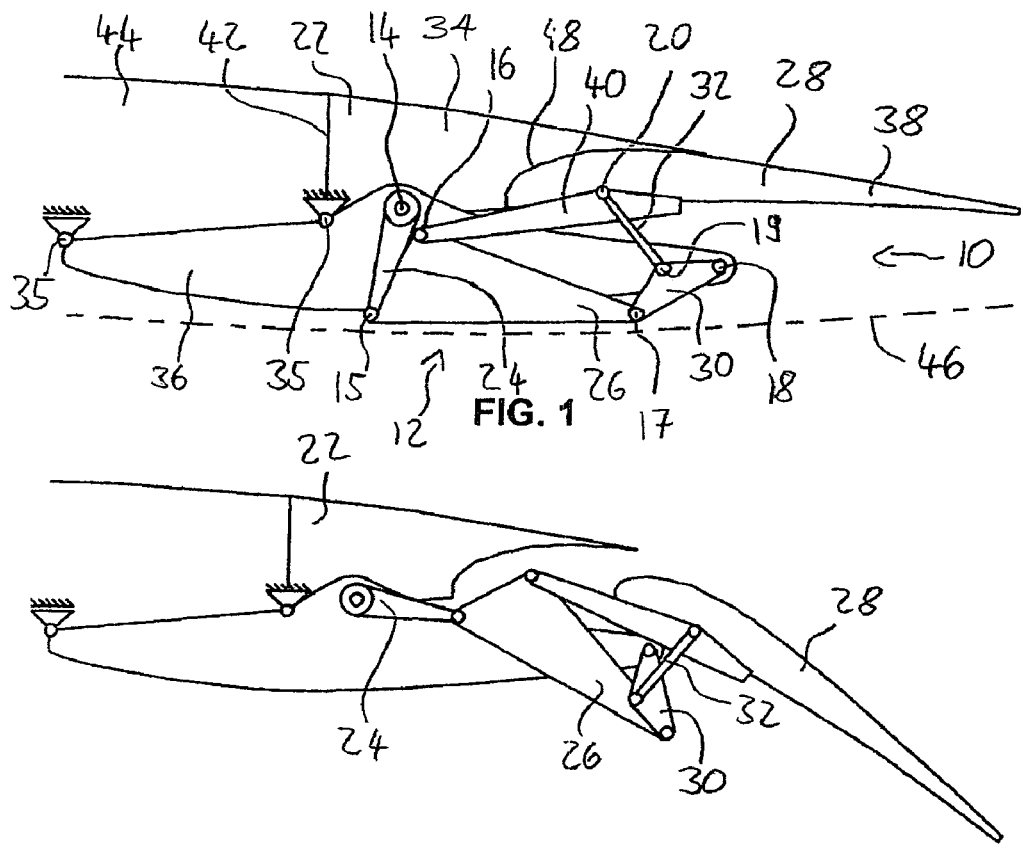

DRIVE AND GUIDE ARRANGEMENT FOR A FLAP WHICH IS ARRANGED ON AN AIRCRAFT MAINPLANE

FIELD OF THE INVENTION

The invention relates to a drive and guidance apparatus for a flap which is arranged on an aircraft mainplane, in particular for a trailing-edge or landing flap.

BACKGROUND OF THE INVENTION

A large number of drive and guidance apparatuses are known for flaps which are arranged on aircraft mainplanes, with a suitable kinematic type being used depending on the aerodynamic and structural constraints. A summary is provided by Holert, Carl, "Interdisziplinäre Synthese von Klappenführungsmechanismen, Deutscher Luft- und Raumfahrtkongress", Stuttgart 2002, DGLR-JT2002-155 [Interdisciplinary synthesis of flap guidance mechanisms, German Aviation and Spaceflight Congress].

This document describes a drive and guidance apparatus for a flap, which is arranged on an aircraft mainplane, for a trailing-edge or landing flap, as is illustrated in FIG. 4. The drive and guidance apparatus 100 illustrated there for the starboard wing comprises, when viewed from the aircraft fuselage, a six-element guide chain 102 with seven rotating joints 104-110 of the kinematic Watt-I chain type with one or more shafts. In this case, a first coupling element 116, which is mounted via a crank 114 that is connected to the aircraft mainplane 112 such that it can rotate, is itself in turn connected to the flap 118 and to a second coupling element 120, such that it can rotate, with the second coupling element 120 being mounted on the aircraft mainplane 112 such that it can rotate. In this case, the second coupling element 120 is connected to the flap 118 via an oscillating support 122. The aircraft mainplane 112 has a wing trailing-edge geometry 124 and a flap mount 126 which is firmly connected to it. The landing flap 118 has a landing-flap geometry 128 and a flap coupling element 130 which is firmly connected to it. The flap mount 126 and the flap coupling element 130 are components of the guidance apparatus 100 and connect the landing flap 118 to the aircraft mainplane 112. A crank 114 which is driven by means of a rotational drive is located in a joint 104 on the flap mount 126. The crank 114 drives the guidance apparatus 100 and rotates it clockwise for extension of the flap 118. The crank 114 is connected to the first coupling element 116 in the joint 105 such that it can rotate, and the first coupling element 116 is itself connected to the flap coupling element 130 in a joint 106 and to the second coupling element 120 in a joint 107. The second coupling element 120 is connected to the flap mount 126 via the joint 108, and is connected to the oscillating support 122 in the joint 109. The oscillating support 122 is connected to the flap coupling element 130 in a joint 110.

This apparatus according to the prior art has an unsatisfactory drive torque profile over the extension movement of the flap. The apparatus requires a large fairing and thus produces a large amount in drag during cruising flight.

SUMMARY OF THE INVENTION

The object of the invention is to achieve a more uniform drive torque profile over the extension movement of the flap, and a more compact design.

The invention achieves the object by means of an apparatus as claimed in the features of claim 1.

The apparatus according to the invention has a number of advantages. It carries out complex guidance tasks even with more than three plane positions as well as large translational movements of the flap with small dimensions and with low drive loads. Small dimensions lead to small fairings which are to be used to cover drive and guidance apparatuses underneath the mainplane, and this in turn leads to an improvement in the aerodynamic characteristics of the wing. More than three plane positions have to be provided particularly in the case of continuous flap movements, which can be integrated for the variation of the wing profile curvature in future high-lift systems.

Since, in contrast to many other systems, the apparatus does not include any carriage as a thrust joint, there is also no need to prevent jamming situations occurring on this element. Since rotating joints can be regarded as being free of jamming, the elements of the apparatus according to the invention are designed for the loads which occur during operation. These loads are normally below the level of fault-dependent loads. This in turn results in a drive and guidance apparatus according to the invention being lighter in weight.

The arrangement of the elements allows the mechanical drive either to be integrated in the flap mount or to be arranged in the area behind a rear spar of the mainplane. Integration in the flap mount offers the advantage of clear load introduction into the wing using the mount structure, which is present in any case, to assist the drive, and without any additional mount being required for the drive. The small amount of space behind the rear spar remains free for the integration of other systems.

The accommodation of the drive in the space behind the rear spar has the advantage that the mechanical drive power need not be passed via shafts and transmissions from the area behind the rear spar to the flap mount. The mechanical drive train at the rear spar can in fact be passed through virtually in a straight line on the rear spar.

BRIEF DESCRIPTION OF THE DRAWINGS

In order to more fully describe embodiments of the present invention, reference is made to the accompanying drawings. These drawings are not to be considered limitations in the scope of the invention but are merely illustrative.

FIG. 1 shows the schematic design of a guidance apparatus according to the invention with a rotational drive in the retracted position.

FIG. 2 shows the schematic design of the guidance apparatus according to the invention as shown in FIG. 1 in the extended position.

FIG. 3 shows the schematic design of a further embodiment of a guidance apparatus according to the invention, with a linear drive acting on the front coupling element, in the retracted position.

REFERENCE NUMERALS

Figure 4:
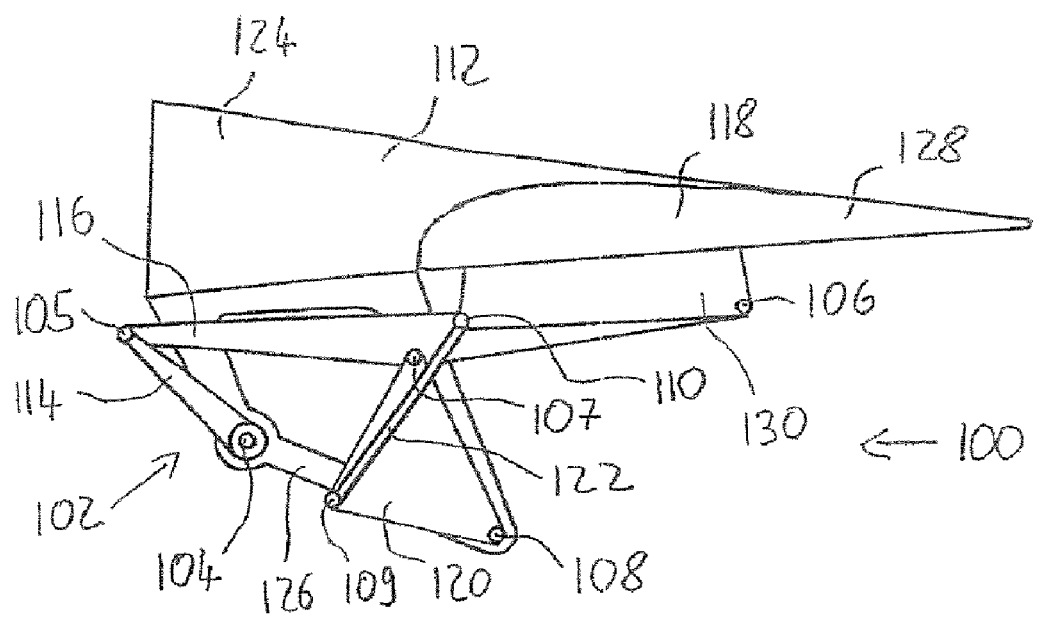
FIG. 4 shows the schematic design of a guidance apparatus of the same transmission type, according to the prior art.

10 Drive and guidance apparatus
12 Six-element guide chain
14-20 Rotating joints
22 Aircraft mainplane
24 Crank
26 First coupling element
28 Flap
30 Second coupling element
32 Oscillating support 34 Wing trailing-edge geometry
35 Bearing
36 Flap mount
38 Landing-flap geometry
40 Flap coupling element
42 Rear spar
44 Tank space
46 Fairing
48 Contour
50 Drive and guidance apparatus
51 Aircraft mainplane
52 Crank
54 Coupling element
56 Flap mount
58 Joint
60 Linear actuating drive
62 Joint
64 Rotating joint

DETAILED DESCRIPTION OF SPECIFIC EMBODIMENTS

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only.

FIG. 1 shows a drive and guidance apparatus 10 according to the invention for the starboard wing, viewed from the aircraft fuselage. This apparatus 10 comprises a six-element guide chain 12 with seven rotating joints 14-20 of the kinematic Watt-I chain type with one or more shafts. In this case, a first coupling element 26, which is mounted via a crank 24 that is connected to the starboard wing of the aircraft mainplane 22 such that it can rotate, is itself in turn connected to the flap 28 and to a second coupling element 30 such that it can rotate, and the second coupling element 30 is mounted on the starboard wing of the aircraft mainplane 22 such that it can rotate. In this case, the second coupling element 30 is connected to the flap 28 via an oscillating support 32. In the illustrated retracted position of the flap, the first coupling element 26 is arranged in front of the second coupling element 30 in the direction of flight.

The starboard wing of the aircraft mainplane 22 has a wing trailing-edge geometry 34 and a flap mount 36 which is firmly connected to it by means of the bearings 35. The landing flap 28 has a landing-flap geometry 38 and a flap coupling element 40 which is firmly connected to it. The flap mount 36 and the flap coupling element 40 are components of the guidance apparatus 10 and connect the landing flap 28 to the starboard wing of the aircraft mainplane 22. A crank 24 which is driven by means of an actuating drive is located in a joint 14 on the flap mount 36. The actuating drive in this example is a rotational drive.

The crank 24 drives the guidance apparatus 10 and rotates it for extension of the flap 28 in the counterclockwise direction. The crank 24 is thus arranged in such a manner that the rotation direction of the crank 24 for extension of the flap 28 corresponds to the rotation direction of the crank for the trailing-edge flap on the starboard wing of the mainplane 22, with the rotation direction of the crank for the trailing-edge flap on the starboard wing of the mainplane being counterclockwise when viewed from the aircraft fuselage.

The crank 24 is connected to the first coupling element 26 in the joint 15 such that it can rotate, and the first coupling element 26 is itself connected to the flap coupling element 40 in a joint 16 and to the second coupling element 30 in a joint 17. The second coupling element 30 is connected to the flap mount 36 via the joint 18, and is connected to the oscillating support 32 in the joint 19. The oscillating support 32 is connected to the flap coupling element 40 in a joint 20. A rear spar 42 is a component of the starboard wing of the aircraft mainplane 22, and separates the wing trailing-edge geometry 34 from a tank space 44. The drive and guidance apparatus 10 is covered by a fairing 46.

In a cruise-flight configuration as illustrated in FIG. 1, the flap geometry 38 is adjacent to the contour 48 of the wing trailing-edge geometry 34. The drive and guidance apparatus is completely covered by the fairing 46 in this position.

FIG. 2 shows the guidance apparatus 10 according to the invention from FIG. 1 in the extended position. Operation of the crank 24 via the actuating drive in the counterclockwise direction in FIG. 1 results in the first coupling element 26 being moved to the rear, to the position shown in FIG. 2. During this process, the second coupling element 30 is rotated by the first coupling element 26 to the illustrated position. During this process, the flap 28 is first of all moved predominantly translationally to the rear, to an intermediate position that is not shown. The flap then rotates mainly to the fully extended landing position, as shown in FIG. 2. The rear part of the fairing is in this case folded downwards by means of auxiliary kinematics, which are not illustrated, in order to provide the required space for the rotating landing flap. The flap 28 is moved to the position illustrated in FIG. 2, in which it is firstly connected to the first coupling element 26 and is secondly supported via the oscillating support 32 on the second coupling element 30.

FIG. 3 shows a further embodiment of a guidance apparatus according to the invention with a linear drive, which acts on the front coupling element, in the retracted position. Identical elements to those in FIG. 1 are provided with reference symbols followed by primes. FIG. 3 shows a drive and guidance apparatus 50 according to the invention for the starboard wing, viewed from the aircraft fuselage. In this case, a first coupling element 54, which is mounted via a crank 52, in this case an oscillating support that is connected to the starboard wing of the aircraft mainplane 51 such that it can rotate, is itself in turn connected to the flap 28' and to a second coupling element 30' such that it can rotate, which is mounted on the starboard wing of the aircraft mainplane 51 such that it can rotate. In this case, the second coupling element 30' is connected to the flap 28' via an oscillating support 32'. The starboard wing of the aircraft mainplane 51 has a wing trailing-edge geometry 34' and a flap mount 56 which is firmly connected to it by means of the bearings 35'. The flap 28' has a landing-flap geometry 38' and a flap coupling element 40' which is firmly connected to it. The flap mount 56 and the flap coupling element 40' are components of the guidance apparatus 50 and connect the flap 28' to the starboard wing of the aircraft mainplane 51. The crank 52 is connected to a joint 58, such that it can rotate freely, on the flap mount 56. The crank 52 is connected to the first coupling element 54 such that it can rotate, and the first coupling element 54 is itself connected to the flap coupling element 40' and to the second coupling element 30'. The second coupling element 30' is connected to the flap mount 56 and to the oscillating support 32' such that it can rotate. The oscillating support 32' is connected to the flap coupling element 40'. The drive and guidance apparatus 50 is covered by a fairing 46'.

A linear actuating drive 60 is connected to the flap mount 56 in a joint 62 such that it can rotate. The linear actuating drive 60 drives the first coupling element 54 via a rotating joint 64 and thus the guidance apparatus 50.

The crank 52 rotates in the counterclockwise direction for extension of the flap 28'. The crank 52 is thus arranged in such a manner that the rotation direction of the crank 52 for extension of the flap 28' corresponds to the rotation direction of the crank for the trailing-edge flap on the starboard wing of the mainplane 51, with the rotation direction of the crank for the trailing-edge flap on the starboard wing of the mainplane being in the counterclockwise direction when viewed from the aircraft fuselage.

Alternatively, the drive and guidance apparatus has a translational actuating drive, which is not shown but is linked to the flap or to the crank. The flap or the crank in these cases has an additional joint.

In a further embodiment, which is not shown, the drive and guidance apparatus has a rotational actuating drive which is linked via an oscillating support to the first coupling element, to the flap or to the crank. The first coupling element, the flap or the crank in these cases has an additional joint.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments of the foregoing description, but rather is indicated by the appended claims. All changes that come within the meaning and range of equivalents within the claims are intended to be considered as being embraced within the spirit and scope of the claims.

The invention claimed is:

1. A drive and guidance apparatus for a trailing-edge flap which is arranged on an aircraft mainplane, comprising a six-element guide chain having seven rotating joints and one or more shafts;

wherein the guide chain is a six-element-seven rotating joint Watt-I chain, the Watt-I chain comprising a first coupling element, which is mounted via a crank that is connected to the aircraft mainplane such that the crank can rotate, the first coupling element arranged between the crank and the trailing-edge flap, the first coupling element in turn being connected to the trailing-edge flap and to a second coupling element such that the first coupling element can rotate, the second coupling element is mounted on the aircraft mainplane such that the second coupling element can rotate, with the second coupling element being connected to the trailing-edge flap via an oscillating support, wherein the crank is arranged in such a manner that the rotation direction of the crank for extension of the trailing-edge flap corresponds to the rotation direction of the crank for the trailing-edge flap of a starboard wing of the mainplane, with the rotation direction of the crank for the trailing-edge flap of the starboard wing being counterclockwise when viewed from the aircraft fuselage.

2. The drive and guidance apparatus as claimed in claim 1, with the crank being in the form of a rotational actuating drive.

3. The drive and guidance apparatus as claimed in claim 2, with the first coupling element being arranged in front of the second coupling element in the direction of flight when the flap is in the retracted position.

4. The drive and guidance apparatus as claimed in claim 1, with the drive and guidance apparatus having a rotational actuating drive which is linked via a second oscillating support to the first coupling element, to the flap or to the crank.

5. The drive and guidance apparatus as claimed in claim 4, with the first coupling element being arranged in front of the second coupling element in the direction of flight when the flap is in the retracted position.

6. The drive and guidance apparatus as claimed in claim 1, with the drive and guidance apparatus having a translational actuating drive which is linked to the first coupling element, to the flap or to the crank.

7. The drive and guidance apparatus as claimed in claim 6, with the first coupling element being arranged in front of the second coupling element in the direction of flight when the flap is in the retracted position.

8. The drive and guidance apparatus as claimed in claim 1, with the first coupling element being arranged in front of the second coupling element in the direction of flight when the flap is in the retracted position.

* * * * *